(12) United States Patent
Bayer et al.

(10) Patent No.: US 8,676,539 B2
(45) Date of Patent: Mar. 18, 2014

(54) SYSTEM AND METHOD FOR RAPIDLY LOCATING HISTORICAL PERFORMANCE DATA

(75) Inventors: Christopher Bayer, Slough (GB); Nigel Trousdale, Slough (GB)

(73) Assignee: CA, Inc., Islandia, NY (US)

( * ) Notice: Subject to any disclaimer, the term of this patent is extended or adjusted under 35 U.S.C. 154(b) by 1135 days.

(21) Appl. No.: 11/937,716

(22) Filed: Nov. 9, 2007

(65) Prior Publication Data

US 2008/0065442 A1   Mar. 13, 2008

Related U.S. Application Data

(63) Continuation of application No. 10/190,943, filed on Jul. 8, 2002, now abandoned.

(60) Provisional application No. 60/303,431, filed on Jul. 6, 2001.

(51) Int. Cl.
   *G06F 11/30* (2006.01)
   *G21C 17/00* (2006.01)
   *G06F 17/40* (2006.01)

(52) U.S. Cl.
   USPC ............................ 702/186; 702/182; 702/187

(58) Field of Classification Search
   USPC ................................................ 702/187, 182
   See application file for complete search history.

(56) References Cited

U.S. PATENT DOCUMENTS

| | | | |
|---|---|---|---|
| 6,026,391 A * | 2/2000 | Osborn et al. | 707/2 |
| 6,061,724 A | 5/2000 | Ries et al. | 709/224 |
| 2002/0152120 A1* | 10/2002 | Howington | 705/14 |
| 2003/0065774 A1* | 4/2003 | Steiner et al. | 709/225 |

FOREIGN PATENT DOCUMENTS

WO   WO 92/17853 A   10/1992   ............. G06F 15/40

OTHER PUBLICATIONS

Communication from the European Patent Office enclosing the Supplementary European Search Report under Article 157(2)(a) EPC for International Application No. PCT/US0221451, Oct. 4, 2006.

* cited by examiner

*Primary Examiner* — Janet Suglo
(74) *Attorney, Agent, or Firm* — Baker Botts, L.L.P.

(57) ABSTRACT

A method is described for providing performance metrics stored in an array of at least three-dimensions. The method includes receiving at least one metric criteria associated with a performance metric. The method also includes determining a list of array elements. The list represents a portion of the array including the at least one metric criteria. The method further includes sorting the list of array elements according to predetermined ordering criteria to identify a best match of the at least one metric criteria. A system and article of manufacture are also described for providing performance metrics stored in an array of at least three dimensions.

20 Claims, 5 Drawing Sheets

SYSTEM AND METHOD FOR RAPIDLY LOCATING HISTORICAL PERFORMANCE DATA

RELATED APPLICATION

This application is a continuation of U.S. patent application Ser. No. 10/190,943 filed Jul. 8, 2002 entitled "System and Method for Rapidly Locating Historical Performance Data", which claims priority to U.S. Provisional Application Ser. No. 60/303,431 filed Jul. 6, 2001, each of which are hereby incorporated by reference in their entirety.

TECHNICAL FIELD OF THE INVENTION

The described systems and methods are generally related to information processing environments and managing modem computer systems and associated electronic devices. More specifically, the described systems and methods are related to rapidly obtaining historical performance data.

BACKGROUND OF THE INVENTION

Enterprises employ large, complex, computing environments that include a number of enterprise components such as servers, routers, databases, mainframes, personal computers, intelligent agents and business applications, for example. Systems that monitor complex enterprise computing environments are known in the art. From time to time, such monitoring systems monitor and analyze the performance of enterprise components, and it is useful for such monitoring systems to have rapid access to certain metrics regarding performance of the components being analyzed. Such metrics may be sampled on-demand in real-time or fetched from a large historical data repository.

Typically, large repositories of historical data describing enterprise component performance are created over time by enterprise monitoring systems configured to track and record performance data for certain enterprise components or groups of components. Such performance data may be useful in analyzing the operation of a component or group of components, for example, to schedule future operations or to report the performance of the component(s) over time.

Enterprises typically have certain criteria to determine whether and which components are subject to performance monitoring. Over time, changes to the configuration of an enterprise system, changes to the criteria for collecting performance data, and the addition and removal of enterprise components may result in an incomplete performance history for any particular component. Consequently, such historical data repositories are complex stores which may not include data for every enterprise component, or for every time period.

Gaps in historical performance data may adversely affect the ability of the monitoring system to project the future performance of a particular component. Consequently, there is a need for methods and systems that rapidly provide an estimate of historical performance of an enterprise component despite incomplete historical performance data.

SUMMARY OF THE INVENTION

The following presents a simplified summary of methods, systems, and computer readable media associated with rapidly locating historical performance data. This summary is not an extensive overview and is not intended to identify key or critical elements of the methods, systems, and/or media or to delineate the scope of the methods, systems, and media. It conceptually identifies the methods, systems, and media in a simplified form as a prelude to the more detailed description that is presented later.

This disclosure provides methods and systems for accessing performance metrics stored in an array of at least three dimensions. According to one aspect of the disclosure, a method for providing performance metrics stored in an array is disclosed. The method includes receiving a metric criteria that is associated with a performance metric and determining a list of array elements. The list of array elements represents a portion of the array including the metric criteria. The list is sorted according to a predetermined ordering criteria. In one embodiment, the method also includes analyzing each array element of the list to determine whether it best matches the at least one metric criteria. If a best match is determined, a reference to an array element may be returned that best matches the performance metric. If no best match is determined, an error code may be returned.

In accordance with a second aspect of the present application, a system is disclosed for providing performance metrics stored in an array of at least three dimensions. The system includes means for receiving at least one metric criteria associated with a performance metric. The system also includes means for determining a list of array elements. The list represents a portion of the array including at least one metric criteria. The system further includes means for sorting the list of array elements according to predetermined ordering criteria, and means for analyzing each array element of the list to determine whether it best matches the at least one metric criteria.

In accordance with another aspect of the present application, an article of manufacture is also disclosed. The article of manufacture includes processing instructions for providing performance metrics stored in an array of at least three dimensions.

Certain illustrative aspects of the methods, systems, and computer readable media are described herein in connection with the following description and the annexed drawings. These aspects are indicative, however, of but a few of the various ways in which the principles of the methods, systems, and media may be employed and thus the examples are intended to include such aspects and equivalents. Other advantages and novel features may become apparent from the following detailed description when considered in conjunction with the drawings.

BRIEF DESCRIPTION OF THE DRAWINGS

For a more complete understanding of the present methods and systems, reference is now made to the following description taken in conjunction with the accompanying drawings in which like reference numbers indicate like features and wherein.

DETAILED DESCRIPTION

Figure 1:
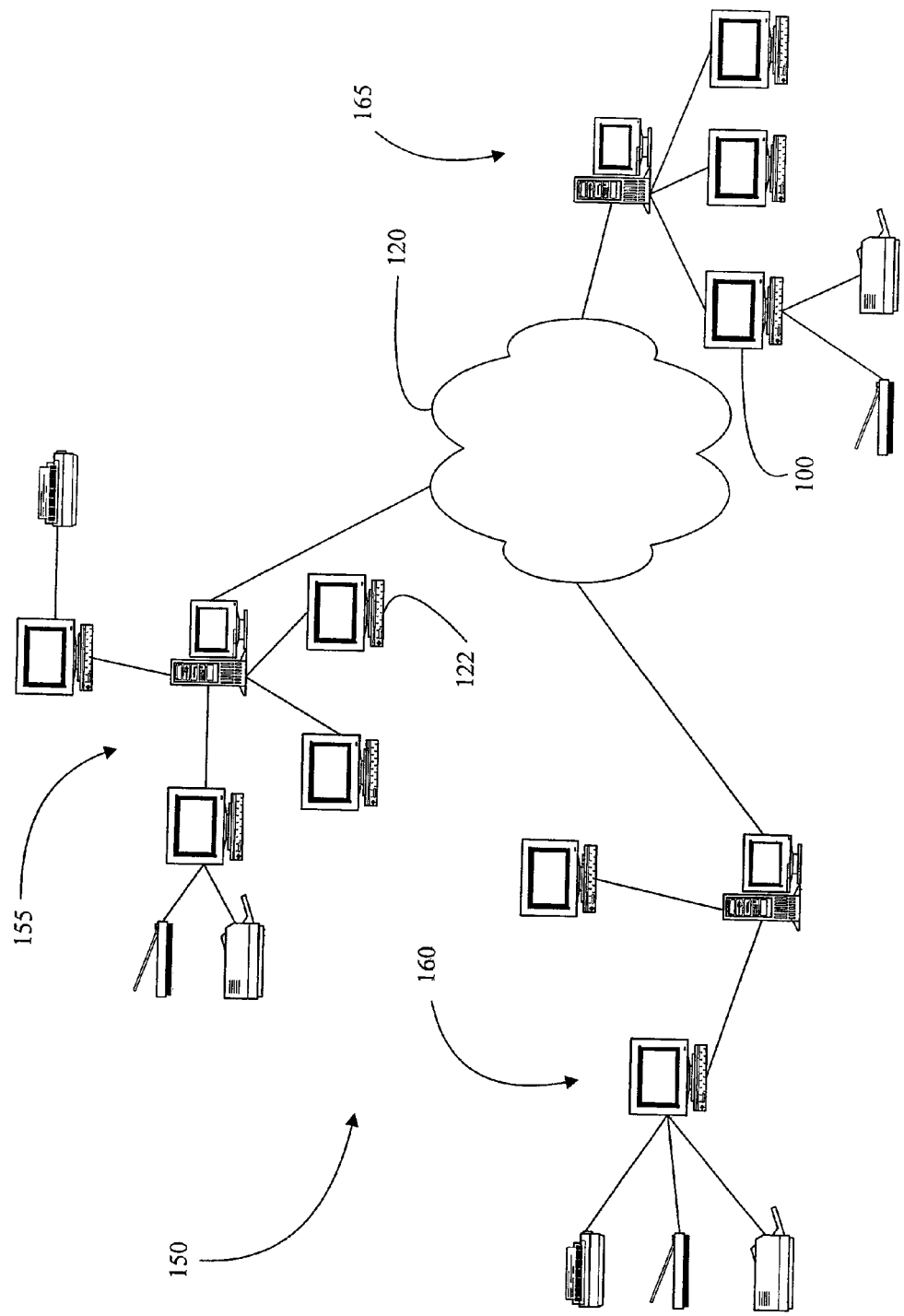
FIG. 1 is a schematic block diagram of an example enterprise environment that may employ example systems and/or methods for enterprise management.

Example methods, systems, and computer readable media are now described with reference to the drawings, where like reference numerals are used to refer to like elements throughout. In the following description, for purposes of explanation, numerous specific details are set forth in order to facilitate thoroughly understanding the methods and systems. It may be evident, however, that the methods and systems can be practiced without these specific details. In other instances, well-known structures and devices are shown in block diagram form in order to simplify the description.

An exemplary IT enterprise is illustrated in FIG. 1. The IT enterprise 150 includes local area networks 155, 160 and 165. Communications between local area networks 155, 160 and 165, are facilitated by an intranet, extranet or internet infrastructure 120. IT enterprise 150 further includes a variety of hardware and software components, such as workstations, printers, scanners, routers, operating systems, applications, and application platforms, for example. Each component of IT enterprise 150, such as computer 100 and computer 122, for example, may be monitored, analyzed and managed in accordance with the present disclosure.

Figure 2:
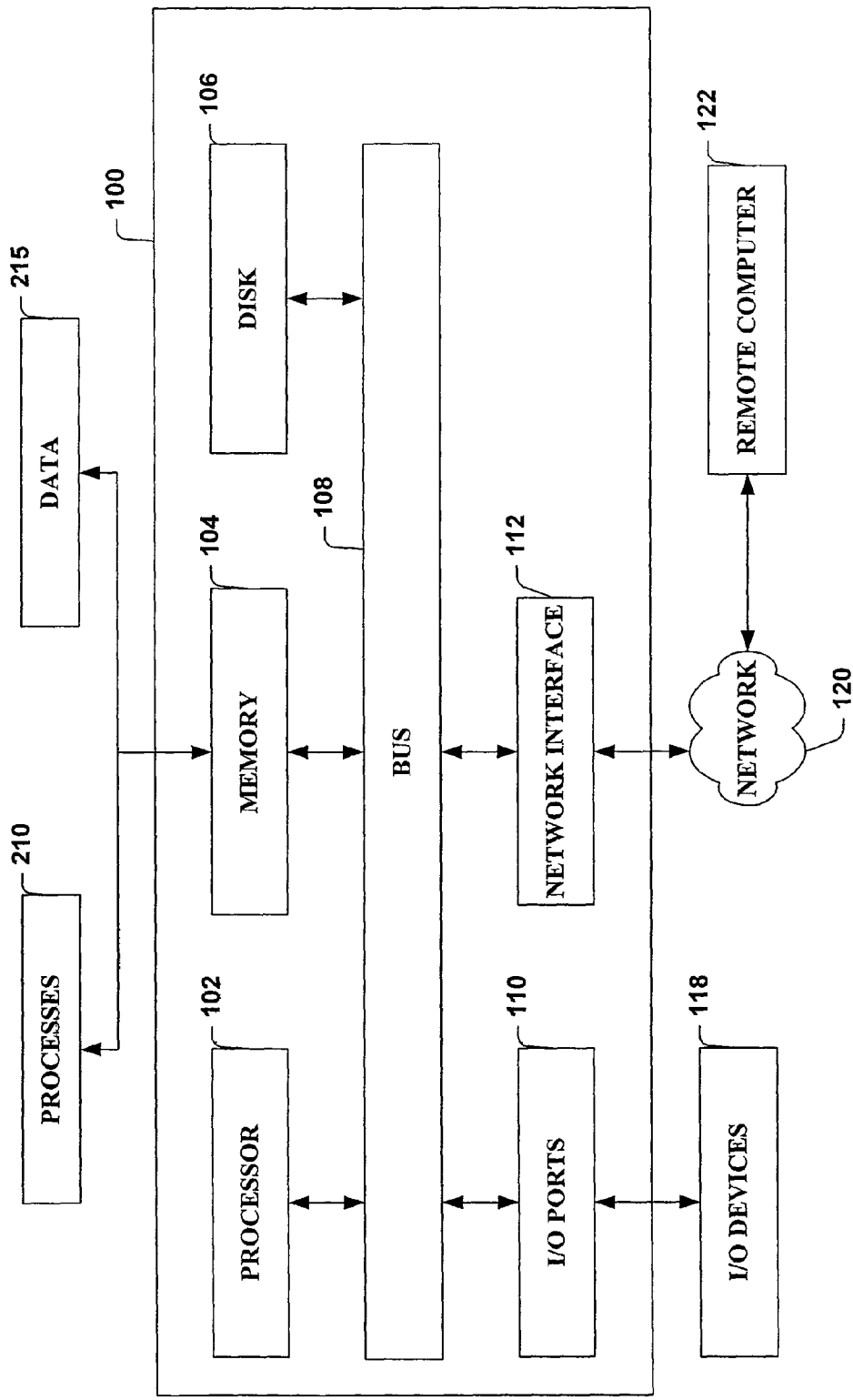
FIG. 2 is a schematic block diagram of a personal computer within the enterprise environment illustrated in FIG. 1 that can support example systems and/or methods for enterprise management.

FIG. 2 illustrates example computer 100 that includes a processor 102, a memory 104, a disk 106, input/output ports 110, and a network interface 112 operably connected by a bus 108. The processor 102 can be a variety of various processors including dual microprocessor and other multi-processor architectures. The memory 104 can include volatile memory and/or nonvolatile memory. The non-volatile memory can include, but is not limited to, read only memory ("ROM"), programmable read only memory ("PROM"), electrically programmable read only memory ("EPROM"), electrically erasable programmable read only memory ("BEPROM"), and the like. Volatile memory can include, for example, random access memory ("RAM"), synchronous RAM ("SRAM"), dynamic RAM ("DRAM"), synchronous DRAM ("SDRAM"), double data rate SDRAM ("DDR SDRAM"), and direct RAM bus RAM ("DRRAM"). The disk 106 can include, but is not limited to, devices like a magnetic disk drive, a floppy disk drive, a tape drive, a Zip drive, a flash memory card, and/or a memory stick. Furthermore, the disk 106 can include optical drives like, a compact disk ROM ("CD-ROM"), a CD recordable drive ("CDR drive"), a CD rewriteable drive ("CD-RW drive") and/or a digital versatile ROM drive ("DVD ROM"). The memory 104 can store processes 114 and/or data 116, for example. The disk 106 and/or memory 104 can store an operating system that controls and allocates resources of the computer 100.

The bus 108 can be a single internal bus interconnect architecture and/or other bus architectures. The bus 108 can be of a variety of types including, but not limited to, a memory bus or memory controller, a peripheral bus or external bus, and/or a local bus. The local bus can be of varieties including, but not limited to, an industrial standard architecture ("ISA") bus, a microchannel architecture ("MSA") bus, an extended ISA ("EISA") bus, a peripheral component interconnect ("PCI") bus, a universal serial ("USB") bus, and a small computer systems interface ("SCSI") bus.

The computer 100 interacts with input/output devices 118 via input/output ports 110. The input/output devices 118 can include, but are not limited to, a keyboard, a microphone, a pointing and selection device, cameras, video cards, displays, and the like. The input/output ports 110 can include but are not limited to, serial ports, parallel ports, and USB ports.

The computer 100 can operate in a network environment and thus is connected to a network 120 by a network interface 112. Through the network 120, the computer 100 may be logically connected to a remote computer 122. The network 120 may include, but is not limited to, local area networks ("LAN"), wide area networks ("WAN"), and other networks. The network interface 112 can connect to local area network technologies including, but not limited to, fiber distributed data interface ("FDDI"), copper distributed data interface ("CDDI"), ethernet/IEEE 802.3, token ring/IEEE 802.5, and the like. Similarly, the network interface 112 can connect to wide area network technologies including, but not limited to, point to point links, and circuit switching networks like integrated services digital networks ("ISDN"), packet switching networks, and digital subscriber lines ("DSL").

Figure 3:
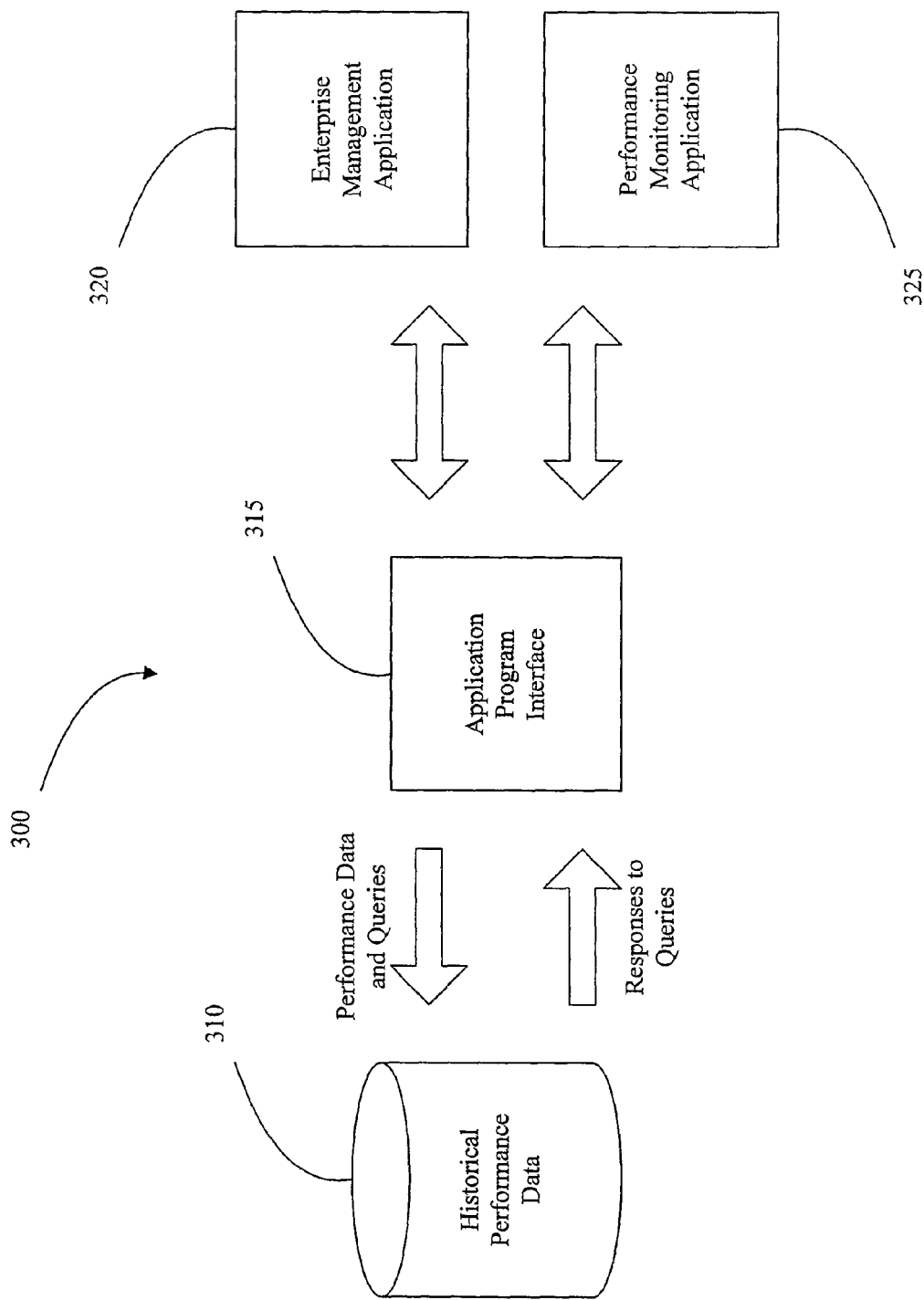
FIG. 3 is a schematic block diagram of an exemplary system for storing, maintaining and accessing historical performance data.

FIG. 3 illustrates one exemplary system 300 for storing, maintaining and accessing historical performance data. The exemplary system includes a store of historical performance data 310 which enables storage and retrieval of historical performance data. The system further includes an application programming interface ("API") 315 that defines a standard set of access routines for storage and retrieval of the historical performance data of store 310. API 315 is employed, for example, by an enterprise management application 320 and a performance monitoring application 325 to populate store 310 and to retrieve data from store 310 through queries and responses.

Figure 4:
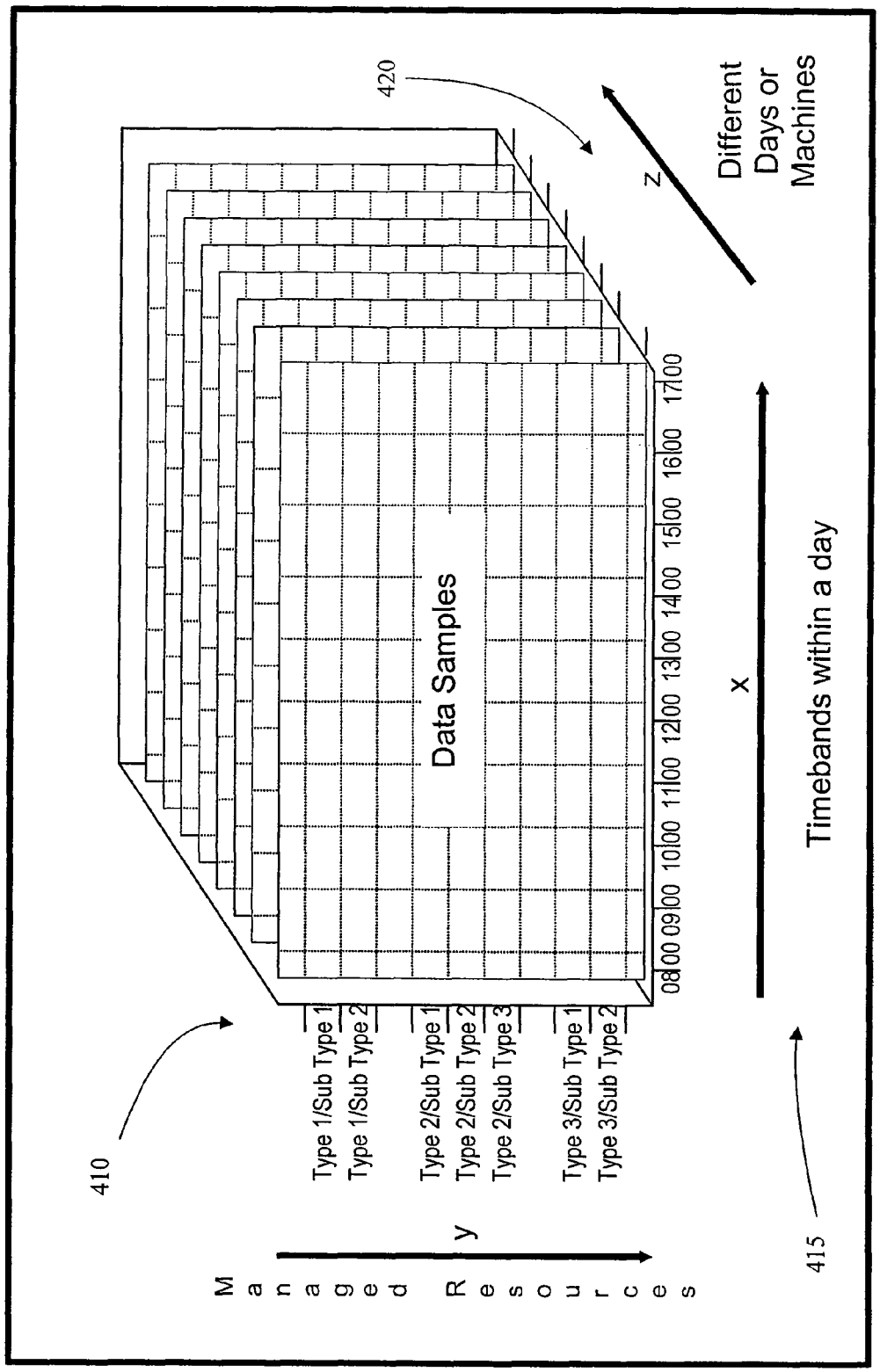
FIG. 4 is a diagram of an example of a store of historical performance data embodied as a three dimensional array of performance elements.

As shown in FIG. 4, in one embodiment, the historical performance data is stored as a three-dimensional array 400 of performance elements called "Performance Cubes". A Performance Cube is a paradigm for representing, analyzing and managing performance information. It is a generic representation and not linked to any specific operating system. Although the example embodiment is described with reference to a three-dimensional array, an array of more than three dimensions may be used in other embodiments.

In the Performance Cube paradigm, data is considered to be stored in a logical Cube lattice, whereby different resources are represented on the y axis 410, time-bands across the day are represented across the x axis 415, and different days (such as Monday, Tuesday or Wednesday), time periods (such as an average day within March, April or June) or machines (such as machine 1, machine 2 or machine 3) are represented along the z axis 420.

Performance Cubes are a model of sampled metrics and their values stored in a three-dimensional lattice. For example, Daily Performance Cubes, which contain data for 1 machine or device for a calendar day and are 2 dimensional in nature, can be aggregated into 3 dimensional Cubes containing data for multiple dates, such as, for example, a calendar week or a calendar month, or multiple machines data for a single day. In this application, such three-dimensional aggregations are called Period and Enterprise Cubes, respectively, where each plane represents a machine-day.

Further aggregation is possible by averaging multi-plane Cubes into single-plane Average Period and Average Enterprise Cubes, and these can be further collated into multi-plane Cubes where each plane is itself an average of multiple planes.

Performance Cube Properties

According to one embodiment, Performance Cubes have certain parameters or properties that may be used or referenced by a Performance Cube Management API. Such properties may include the properties set forth in Table A, below:

TABLE A

Exemplary Cube Properties

| Property | Property Description |
| --- | --- |
| Store Name | The name of the long-term store where the Cube can be found, such as the path name of the directory containing the Cube files, for example. |
| User Description | A string giving a specific description of the Cube. |
| Start Date-Time | The date-time of the start of the first time-band that can be stored in the Cube, or the first date-time used to generate an averaged Cube |
| Number of Time-Bands | The number of samples to be contained by this Cube. |
| Time-Band Size | The number of seconds over which each sample was averaged. |
| Type | The type of data to be stored in each plane of the Cube, and whether there will be more than one plane. |
| Resource Set | This is used to indicate whether a Cube is likely to contain all of the resources that have been collected for a particular platform, or it is likely to contain a subset of these. |

Exemplary Cube Type definitions are illustrated in Table B, below:

TABLE B

Exemplary Cube Types

| Cube Type | Each plane contains data for: | Multiple Planes? |
| --- | --- | --- |
| CAPMPCM_ONE_DAY | One day | No |
| CAPMPCM_SEVERAL_DAYS | One day | Yes |
| CAPMPCM_ONE_WEEK_OF_DAYS | One day | Yes |
| CAPMPCM_ONE_MONTH_OF_DAYS | One day | Yes |
| CAPMPCM_ONE_YEAR_OF_DAYS | One day | Yes |
| CAPMPCM_ONE_ENTERPRISE_DAY | One day | Yes |
| CAPMPCM_ONE AVERAGE DAY | An average day | No |
| CAPMPCM_SEVERAL_AVERAGE_DAYS | An average day | Yes |
| CAPMPCM_ONE_AVERAGE_ENTERPRISE_DAY | An average day | Yes |
| CAPMPCM_ONE_AVERAGE_WEEK | An average week | No |
| CAPMPCM_SEVERAL_AVERAGE_WEEKS | An average week | Yes |
| CAPMPCM_ONE_AVERAGE_ENTERPRISE_WEEK | An average week | Yes |
| CAPMPCM ONE_AVERAGE_MONTH | An average month | No |
| CAPMPCMSEVERAL_AVERAGE_MONTHS | An average month | Yes |
| CAPMPCM_ONEAVERAGE_ENTERPRISE_MONTH | An average month | Yes |
| CAPMPCM_ONE_AVERAGE_YEAR | An average year | No |
| CAPMPCM SEVERALAVERAGE YEARS | An average year | Yes |
| CAPMPCM_ONE_AVERAGEENTERPRISE_YEAR | An average year | Yes |

The Performance Cubes are managed via a Performance Cube Management API, such as API 315, that enables many applications to read and write Cubes without having reference to any underlying implementation format. Further, performance samples can be accessed by an enterprise management application, such as Unicenter TNG, and presented as external property data, thus making them available to any underlying applications. In addition, an application can use Cube management and analysis routines to perform data management functions such as, for example, trending averaging, compacting and extracting the data.

Consequently, any platform running an application that stores performance data using the Performance Cube Management API may manage and exploit the performance data. For example, applications may cause the performance data to be compacted, averaged, or trended which extends the way that other applications can exploit the data.

The Performance Cube Management API provides access to the Performance Cube repository, such as store 310, which may be a complex store containing many Cubes which have the potential to contain the data that an application needs. The present application describes methods and systems, which may include the Performance Cube Management API, for rapidly locating and opening the most appropriate Performance Cube. To meet certain accuracy and timeliness preferences, the systems and methods may employ a cube locating methodology where the cube located is the cube with the most important or highest number of criteria met for a particular call This application refers to such a methodology as a "best match" approach.

The example "best match" approach described in the present application allows the calling application to obtain data for a named machine or device that is appropriate to a particular date without having to specify exactly which Performance Cube to open. The function will search through available Performance Cubes and determine and open the Cube that best matches the callers requirements. This API searches available Performance Cubes including both period and Enterprise Cubes rather than just looking for a daily Cube which contains data for a specific machine on a specific date. Accordingly, if the daily Cube is missing, but there is data in an Enterprise Cube for the requested date then the request will still be satisfied.

Performance Cube Management

In one embodiment, the Performance Cube Management API allows performance samples held in Performance Cube Management ("PCM") format to be created, extracted and transformed by external applications. The API may be supplied as a Windows NT DLL or a Static or Shared Library which provides a number of C functions, which can be divided into three main levels: fundamental, derived and composite functions.

Fundamental or 'low-level' functions are sub-divided into three functional areas—Cube control, Cube population and Cube extraction, and provide a developer with direct access to the Performance Cube, either to load data samples directly into a Cube, or to selectively extract specific data samples from it.

Derived or 'high level' functions provide more application-friendly interfaces to the fundamental functions, and as such are again sub-divided into the same three areas. These functions include the ability to search for Cubes containing certain data, to copy planes of data from one Cube to another etc.

Composite functions are grouped into a single area, known as "Cube transformation". This area provides a simple, very high level interface that allows the developer to transform one or more entire Cubes into another Cube of different specifications, or another format entirely.

Certain fundamental functions allow the developer to open a new or existing Performance Cube, close/write a Cube and delete an existing Cube. Other fundamental functions also allow an application to add new resources, machines/dates and data samples to the Cube. Such functions control the addition of resources and data to a Cube as the data within the Cube is stored in a specialised format and must obey certain rules. For example, a fundamental function may ensure that all the resources held within the Cube have the same number of data samples, and conform to the same time-band intervals. The Cube population functions mask this level of complexity from the developer, by dynamically adjusting the internal structure of the Cube to allow new samples, and returning meaningful error conditions if the application attempts to perform illegal Cube operations.

The fundamental functions allow for the extraction of specific data relating to a Cube. For example, the name or names of machines for which data is stored, the dates on which the data was collected, and the data values and number of samples used to calculate the values may all be extracted using fundamental functions.

Certain derived functions include search and browse capabilities. Derived functions provide mechanisms to manipulate the Cube parameters and data, but with application-friendly arguments, and more complex functionality than the low-level functions. This includes using names to reference items, and bulk operations such as copying complete planes of data from one Cube to another.

They allow the client to extract data from the Cube in a manner that embodies the Performance Cube paradigm. Instead of simply extracting a specific data sample for a given resource, the Cube extraction routines allow the application to extract all data samples pertaining to a specific dimension within the Cube.

The composite functions enable the developer to input the entire contents of a given Performance Cube and transform it into another form. This other form could be another Performance Cube, or a completely different data format. Examples of such transformation functions include:
conversion to comma separated variable ("CSV") form;
averaging across several days, compacting the Cube by combining several adjacent time-bands, or period planes, into one; and
generating a Cube containing data for a subset of the originally monitored resources.

Figure 5:
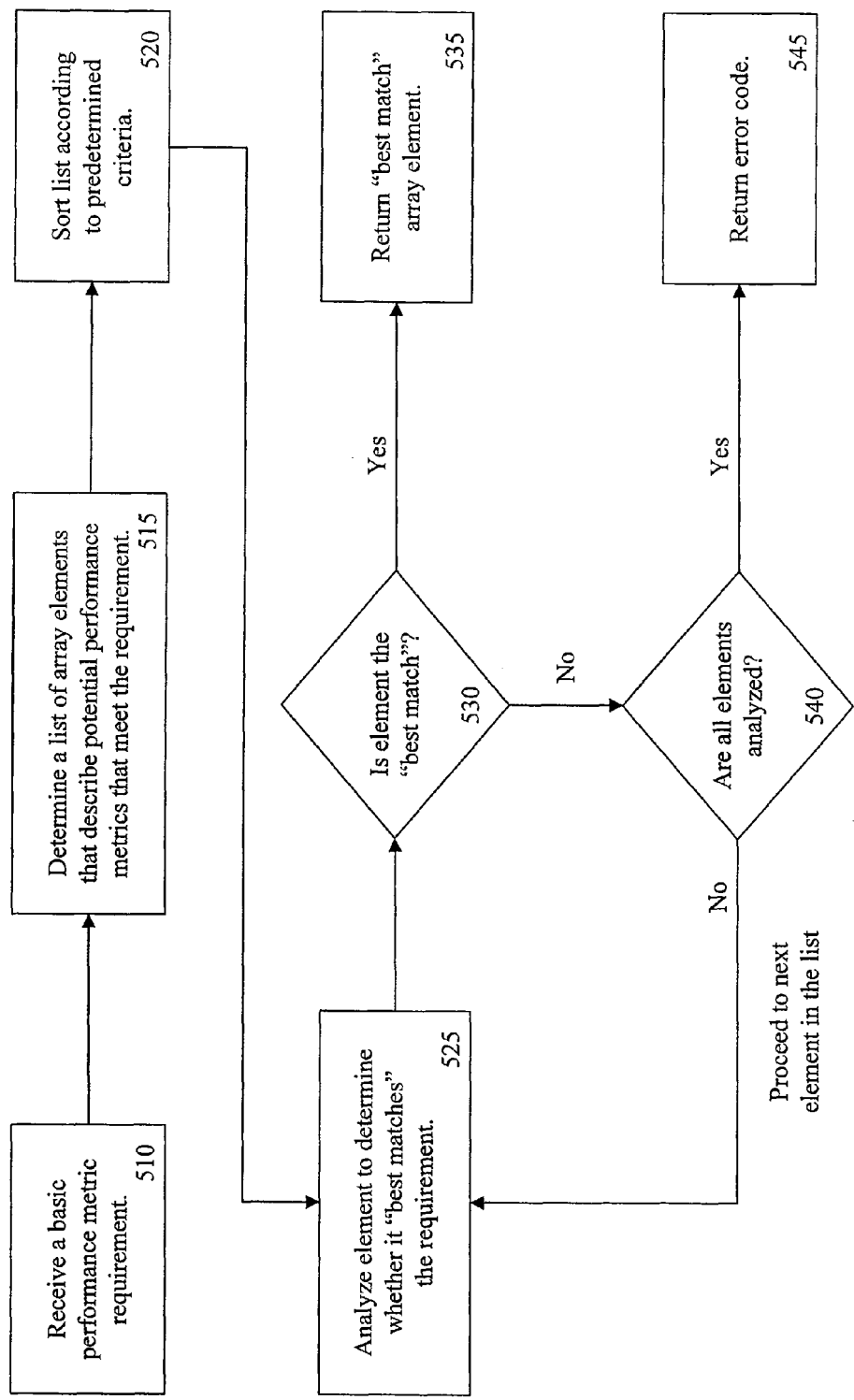
FIG. 5 is a flow chart that illustrates an example method for rapidly locating historical performance data.

Referring now to FIG. 5, there is depicted a block diagram illustrating one methodology 500 for rapidly locating historical performance data. At block 510, at least one basic performance metric requirement is received. The basic performance metric requirement may include a comparator and a value associated with a particular performance metric, such as a date, a machine identifier, a resource set, a Cube type or a user description, for example. In one embodiment, the associated metric(s) may be any data element(s) maintained as part of a Performance Cube.

At block 515 of the methodology, a list of array elements is determined. The array elements included in the list describe performance metrics that meet the requirement received at block 510 and thereby potentially match a query associated with the received requirement. In embodiments in which there are multiple stores of historical performance data, block 515 may include deducing which store(s) to utilize to determine the list of array elements.

At block 520, the list of potentially matching array elements are sorted according to a predetermined order. The sort order is based, in part, on the received requirement. Examples of sort orders include, but are not limited to:
1. Nearness to a required date;
2. Resource set (TRUE in preference to FALSE) because of the increased likeliness of finding all the resources that the caller requires;
3. Nearness to a required Cube type according to the order listed below;
4. Nearness to a required time-band size, with smaller being taken in preference to larger;
5. Nearness to a required date, with earlier taken in preference; and
6. Nearness to a required end-time for the data (required start time plus required number of time-bands times required time-band size), with later taken in preference to earlier.

At block 525, each array element is analyzed to determine whether it "best matches" the received requirement. The sorted list of array elements is traversed from most likely to least likely (as sorted at block 520). Each array element is opened and checked to determine if it contains the correct resources; by default all resources specified must be found for the Cube to be considered a match. This behavior may be altered by certain option flags which may indicate specific rules for selecting a "best match". In an alternate embodiment, the sorting process results in the determination of the "best match", with the "best match" being the first element of the sorted list.

At decision block 530, a "best match" determination is made with respect to an array element If the array element is considered a "best match", a handle, identifier or pointer to the array element is returned and the process ends. If the array element is not considered a "best match", the methodology determines whether all of the sorted potential array elements have been analyzed. If all of the elements have not been analyzed, the process proceeds to the next element in the list and continues processing at step 525. If all of the elements have been analyzed, processing is directed to step 545, at which an error code is returned indicating that no match was found.

According to one embodiment, a "best match" function may be employed by the Performance Cube Management API. The" opens the "best" matching Cube to the caller's specified requirements. A set of option flags can be passed in to modify the default behavior. An example of the function "CaPmPcmopenBestMatch is set forth below:

```
Usage
#ifndef DONE_CAPMPCM
#include <capmpcm.h>
#endif /* DONE CAPMPCM */
...
CAPMPCMRESELEM * resoureeTb1 = NULL; /* Any. */
wchar_t **    userDescriptionTbl = NULL; /* Any. */
char *        storeNameStr   = "D: \Performance Data\
                               performance_Cubes";
struct tm     startDateTime,
              matchDateTime;
int           userDescTblSz  = 0,
              resourceTblSz  = 0,
              reserved       = 0,
              noTimebands    = 144,
              timebandSz     = 300,
              allResourceSet = CAWIN_WILD_INT,
              CubeTypes      = CAPMPCM_ONE_DAY,
              optionFlags    = 0; /* Default. */
```

-continued

```
            CAPMPCM_MACHINE_NAME_STR
                    machineNameStr  = L"fred";
    /***
    *   Initialise the start date-time for the date of .
    *   Use CaPmPcmMkTime.
    ***/
    ...
    /***
    * Locate and open the best matching Cube.
    ***/
        if( ( retrn = CaPmPcmOpenBestMatch( storeNameStr,
                    userDescriptionTbl,
                    userDescriptionTblSz,
                    resourceTbl,
                    resourceTblSz,
                    machineNameStr,
                    &startDateTime,
                    reserved,
                    noTimebands,
                    timebandSz,
                    allResourceSet,
                    CubeTypes,
                    optionFlags,
                    &matchDateTime ) ) < 0 )
        {
    /***
    * Determine and handle the error.
    ***/
            ...
        }
        else
        {
    /***
    * The Cube handle is valid so use it.
    ***/
            ...
        }
```

The arguments for the exemplary function "CaPmPcmOpenBestMatch" are shown in 25 Table C, below:

TABLE C

| CaPmPcmOpenBestMatch Arguments | |
|---|---|
| storeNameStr | (in) Top Cube store root directory to search. Can be NULL to indicate search only the current store (current working directory for filesystem based implementations). The name should not be wild carded. |
| userDescTbl | (in) Array of Cube user descriptions to match. Can be NULL to indicate match all. An element can be NULL or nul string to match no user description. User Description names can be wild-carded using the standard PCM API string wild-carding. |
| userDescTblSz | (in) Size of the above array. Must be 0 if NULL, >0 if non-NULL. |
| resourceTbl | (in) Array of resources to match. Can be NULL to indicate match any. Any of part of the resource name (type, subtype or instance) can be NULL to indicate matches anything or wild-carded using the standard PCM API string wild-carding. |
| resourceTblSz | (in) Size of the above array. Must be 0 if NULL, >0 if non-NULL. |
| machineNameStr | (in) Fully qualified name of machine that data is required for. The machine name should not be wild-carded. |
| startDateTime | (in) The start-time for the Cube and the date for the first plane. The date should not be wild-carded, but the time and DST state can be wild carded with CAWIN_WILD_INT as per normal. |
| reserved | (in) Unused - for future enhancement. Set this to 0. |
| noTimebands | (in) The number of time-bands in the Cube. Set this to the required time-band size, or wild-card it with CAW1NWILD_INT as per normal. |
| timebandSz | (in) The size of each time-band in seconds. Set this to the required time-band size, or wild-card it with CAW1N_WILD_LNT as per normal. |
| allResourceSet | (in) Set to FALSE to indicate a sub-set of all available |

TABLE C-continued

| CaPmPcmOpenBestMatch Arguments | |
|---|---|
| | resources, to TRUE to indicate all available resources or wild-card it with CAWIN_WILD_INT as per normal. |
| CubeTypes | (in) The specific required Cube type or wild-carded with CAWIN_WILD_INT to indicate any type is acceptable, or the new matching value of CAPMPCM_RAW_DAYS_ONLY which indicates any Cube type matches for which the data in the planes is raw original values rather than averages for several days. |
| optionFlags | (in) 0 indicates default behaviour. Option flags can be or'ed together to select multiple options. |
| matchDateTime | (out) The start date-time for the plane in the opened Cube that is the bast match for the request parameters. This it to indicate to the caller which plane of a period Cube is deemed the best match. The date-time will only be valid if a Cube is opened. |

The CaPmPcmOpenBestMatch function is called to locate and open the best matching Cube according to the callers specification. The function employs the methodology illustrated in FIG. 5.

Deduce a list of Cube stores to analyze based on Cube store name and machine name.

Get a list of all the Cubes from the Cube stores that match the users basic requirements for date, machine, resource set, Cube type and user description.

Order the list according to:
1. Nearness to the required date. This is biased by the option flags with the default being that an exact match is required.
2. Resource set (TRUE in preference to FALSE) because of the increased likeliness of finding all the resources that the caller requires.
3. Nearness to the required Cube type according to the order listed below.
4. Nearness to the required time-band size, with smaller being taken in preference to larger (see the CAPMPCM_COMPACT_AS_NECESSARY flag description).
5. Nearness to the required date, with earlier taken in preference.
6. Nearness to the required end-time for the data (required start time plus required
number of time-bands times required time-band size), with later taken in preference to earlier.

Traverse the list from most likely to least likely (as sorted by the previous actions) opening them and checking each one to see if it contains the correct resources; by default all resources specified must be found for the Cube to be considered a match. This behavior can be altered by the option flags. When a match is found generate a virtual Cube if this option has been requested and it is necessary.

If a Cube has been successfully opened return the handle to it and the start date-time of the matching plane, otherwise return the most suitable error code.

The default order in which Cube Types are considered is shown in Table D, below:

TABLE D

| Cube Type Default Order | |
|---|---|
| Best | CAPMPCM_ONE_DAY |
| | CAPMPCM_ONE_ENTERPRISE_DAY |
| | CAPMPCM_ONE_WEEK_OF_DAYS |
| | CAPMPCM_ONE_MONTHOF_DAYS |

TABLE D-continued

Cube Type Default Order

|  |  |
|---|---|
|  | CAPMPCM_ONE_YEAR_OF_DAYS |
|  | CAPMPCM_SEVERAL_DAYS |
|  | CAPMPCM_ONEAVERAGE_WEEK |
|  | CAPMPCM_ONE_AVERAGE_ENTERPRISE_WEEK |
|  | CAPMPCM_SEVERAL_AVERAGE_WEEKS |
|  | CAPMPCM_ONE_AVERAGE_MONTH |
|  | CAPMPCM_ONE_AVERAGE_ENTERPRISE_MONTH |
|  | CAPMPCM_SEVERAL_AVERAGE_MONTHS |
|  | CAPMPCM_ONE_AVERAGE_YEAR |
|  | CAPMPCM_ONE_AVERAGE_ENTERPRISE_YEAR |
|  | CAPMPCM_SEVERAL_AVERAGE_YEARS |
| Worst | CAPMPCM_ONE_AVERAGE_DAY |
|  | CAPMPCM_ONE_AVERAGE_ENTERPRISE_DAY |
|  | CAPMPCM_SEVERAL_AVERAGE_DAYS |

The default behavior can be modified by the specification of a number of option flags. If no optional behavior is required then a 0 value should be passed in. Otherwise, the value passed in should be the bit-wise OR of the individual option flags required.

The options include:

CAPMPCM_COMPACT_ASNECESSARY
   Preferably this means that if the best matching available Cube has a smaller time-band size than requested then a 'virtual' Cube (a Cube that does not exist in permanent store) which has the requested time-band size will be opened and populated by averaging the available Cube.

CAP MP CM_MATCH_DATE_OR_NEAREST_PRIOR
   If a Cube cannot be found containing a plane for the requested date then the nearest earlier date that can be matched will be used.

CAPMPCM_MATCH_DATE_OR NEAREST POST
   If a Cube cannot be found containing a plane for the requested date then the nearest later date that can be matched will be used.

CAPMP CM_MATCH_ANY_RESOURCE
   In order to be a match any one or more of the requested resources must be found in the Cube.

What has been described above includes several examples. It is, of course, not possible to describe every conceivable combination of components or methodologies for purposes of describing the systems, methods, and computer readable media associated with business process policy data. However, one of ordinary skill in the art may recognize that further combinations and permutations are possible. Accordingly, this application is intended to embrace such alterations, modifications, and variations that fall within the scope of the claims. Furthermore, to the extent that the term "includes" is employed in the detailed description or the claims, such term is intended to be inclusive in a manner similar to the term "comprising" as that term is interpreted when employed as a transitional word in a claim.

What is claimed is:

1. A computer-implemented method for providing historical performance data, the computer comprising a memory and a central processing unit, the method comprising:
   storing historical performance data for an enterprise computing environment in an array having at least three dimensions;
   receiving a performance data request requesting selected data from the array of historical performance data;
   determining, using the central processing unit, a list of potentially matching array elements in the array of historical performance data; and
   sorting the list of potentially matching array elements, using the central processing unit, according to predetermined criteria to identify a best match for the performance data request.

2. A computer-implemented method for providing historical performance data, the computer comprising a memory and a central processing unit, the method comprising:
   storing historical performance data for an enterprise computing environment in an array having at least three dimensions;
   receiving a performance data request requesting selected data from the array of historical performance data;
   determining, using the central processing unit, a list of potentially matching array elements in the array of historical performance data;
   sorting the list of potentially matching array elements, using the central processing unit, according to a predetermined criteria; and
   analyzing the list of potentially matching array elements, using the central processing unit, to determine a best matching array element for the performance data request.

3. The method of claim 2, wherein the performance data request includes a date, machine identifier, resource set, Cube type, or user description.

4. The method of claim 2, further comprising:
   receiving an option flag; and
   wherein analyzing the list of potentially matching array elements includes filtering the list of potentially matching array elements according to the option flag.

5. The method of claim 4, wherein the option flag indicates that a best matching array element may represent a time span less than a time span defined by the request for selected performance data.

6. The method of claim 4, wherein the option flag indicates that a best matching array element may represent a nearest earlier time span compared to a time span defined by the request for selected performance data.

7. The method of claim 4, wherein the option flag indicates that a best matching array element may represent a nearest later time span compared to a time span defined by the performance data request.

8. The method of claim 4, wherein the option flag indicates that a best matching array element must represent an exact match of the performance data request.

9. The method of claim 2, further comprising returning a reference to the best matching array element.

10. The method of claim 2, further comprising returning an error code upon determining no best matching array element exists.

11. A system for providing historical performance data, comprising:
   means for storing historical performance data for an enterprise computing environment in an array having at least three dimensions;
   means for receiving a performance data request requesting selected data from the array of historical performance data;
   means for determining a list of potentially matching array elements in the array of historical performance data;
   means for sorting the list of potentially matching array elements according to a predetermined criteria; and
   means for analyzing the list of potentially matching array elements to determine a best matching array element for the performance data request.

12. The system of claim 11, wherein the performance data request includes a date, machine identifier, resource set, Cube type, or user description.

13. The system of claim 11, further comprising:
means for receiving an option flag; and
wherein analyzing the list of potentially matching array elements includes filtering the list of potentially matching array elements according to the option flag.

14. The system of claim 13, wherein the option flag indicates that a best matching array element may represent a time span less than a time span defined by the request for selected performance data.

15. The system of claim 13, wherein the option flag indicates that a best matching array element may represent a nearest earlier time span compared to a time span defined by the request for selected performance data.

16. The system of claim 13, wherein the option flag indicates that a best matching array element may represent a nearest later time span compared to a time span defined by the performance data request.

17. The system of claim 13, wherein the option flag indicates that a best matching array element must represent an exact match of the performance data request.

18. The system of claim 11, further comprising means for returning a reference to the best matching array element.

19. The system of claim 11, further comprising means for returning an error code upon determining no best matching array element exists.

20. A non-transitory computer-readable storage medium encoded with logic operable, when executed by a processor, to:
store historical performance data for an enterprise computing environment in an array having at least three dimensions;
receive a performance data request requesting selected data from the array of historical performance data;
determine a list of potentially matching array elements in the array of historical performance data;
sort the list of potentially matching array elements according to a predetermined criteria; and
analyze the list of potentially matching array elements to determine a best matching array element for the performance data request;
return a reference to the best matching array element.

* * * * *